United States Patent
Chaudhri et al.

(10) Patent No.: US 8,140,085 B2
(45) Date of Patent: Mar. 20, 2012

(54) METHOD AND APPARATUS FOR OPTIMIZING SPECTRUM UTILIZATION BY A COGNITIVE RADIO NETWORK

(75) Inventors: Apoorv Chaudhri, Cambridge, MA (US); David P. Gurney, Carpentersville, IL (US); Stephen L. Kuffner, Algonquin, IL (US); Yadunandana N. Rao, Sunrise, FL (US); Matthew E. Simms, Place, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 746 days.

(21) Appl. No.: 12/241,821

(22) Filed: Sep. 30, 2008

(65) Prior Publication Data

US 2010/0081449 A1 Apr. 1, 2010

(51) Int. Cl.
*H04W 72/00* (2009.01)
(52) U.S. Cl. ............... 455/450; 455/464; 455/452.2; 455/454; 370/329; 370/432
(58) Field of Classification Search .......... 455/450, 455/452.2, 454, 464; 370/329, 432
See application file for complete search history.

(56) References Cited

U.S. PATENT DOCUMENTS

| | | | |
|---|---|---|---|
| 5,485,486 A * | 1/1996 | Gilhousen et al. | 370/335 |
| 6,512,931 B1 * | 1/2003 | Kim et al. | 455/522 |
| 2002/0002052 A1 | 1/2002 | McJenry | |
| 2004/0198369 A1 * | 10/2004 | Kwak et al. | 455/452.2 |
| 2006/0067354 A1 * | 3/2006 | Waltho et al. | 370/433 |
| 2006/0084444 A1 | 4/2006 | Kossi et al. | |
| 2006/0171305 A1 * | 8/2006 | Stefani et al. | 370/228 |
| 2006/0171335 A1 | 8/2006 | Yuen et al. | |
| 2006/0171445 A1 | 8/2006 | Batra et al. | |
| 2007/0201405 A1 * | 8/2007 | Santhanam | 370/335 |
| 2007/0202867 A1 * | 8/2007 | Waltho et al. | 455/423 |
| 2007/0287465 A1 * | 12/2007 | Hyon et al. | 455/450 |
| 2008/0165754 A1 * | 7/2008 | Hu | 370/342 |
| 2009/0010186 A1 * | 1/2009 | Li et al. | 370/310 |
| 2009/0011785 A1 * | 1/2009 | Celebi et al. | 455/522 |
| 2009/0011788 A1 * | 1/2009 | Shan et al. | 455/522 |
| 2009/0086861 A1 * | 4/2009 | Yavuz et al. | 375/346 |
| 2009/0117914 A1 * | 5/2009 | Kwon et al. | 455/454 |
| 2009/0170545 A1 * | 7/2009 | Choi et al. | 455/513 |

OTHER PUBLICATIONS

International Search Report with Writen Opinion—PCT/US2009/054720, mailed Mar. 30, 2010—11 pages.
Takeo Fujii et al—"mMulti-Bank ad-Hoc Cognitive Radio for reducing Inter System Interference"—The 17th Annual IEEE International symposium on PIMRC 2006, Sep. 11-14, 2006—pp. 1-5.

* cited by examiner

*Primary Examiner* — Jinsong Hu
*Assistant Examiner* — Quin Shen
(74) *Attorney, Agent, or Firm* — Barbara R. Doutre

(57) ABSTRACT

A technique for a secondary communication system to utilize spectrum designated to another (or primary) communication system is provided. By ranking a plurality of secondary base stations based on base station transmit power, calculated required transmit power and path loss, a set of criteria is developed for selecting a highest ranked secondary base station for operation within a primary's spectrum. The ranking may be adapted based on mobility of the secondary's subscriber; and as such the secondary system communicates within the primary's spectrum using the adaptively ranked base stations. Channel selection may also be ranked. The technique and apparatus allows a cognitive radio (CR) network to operate within an incumbent network's spectrum.

9 Claims, 6 Drawing Sheets

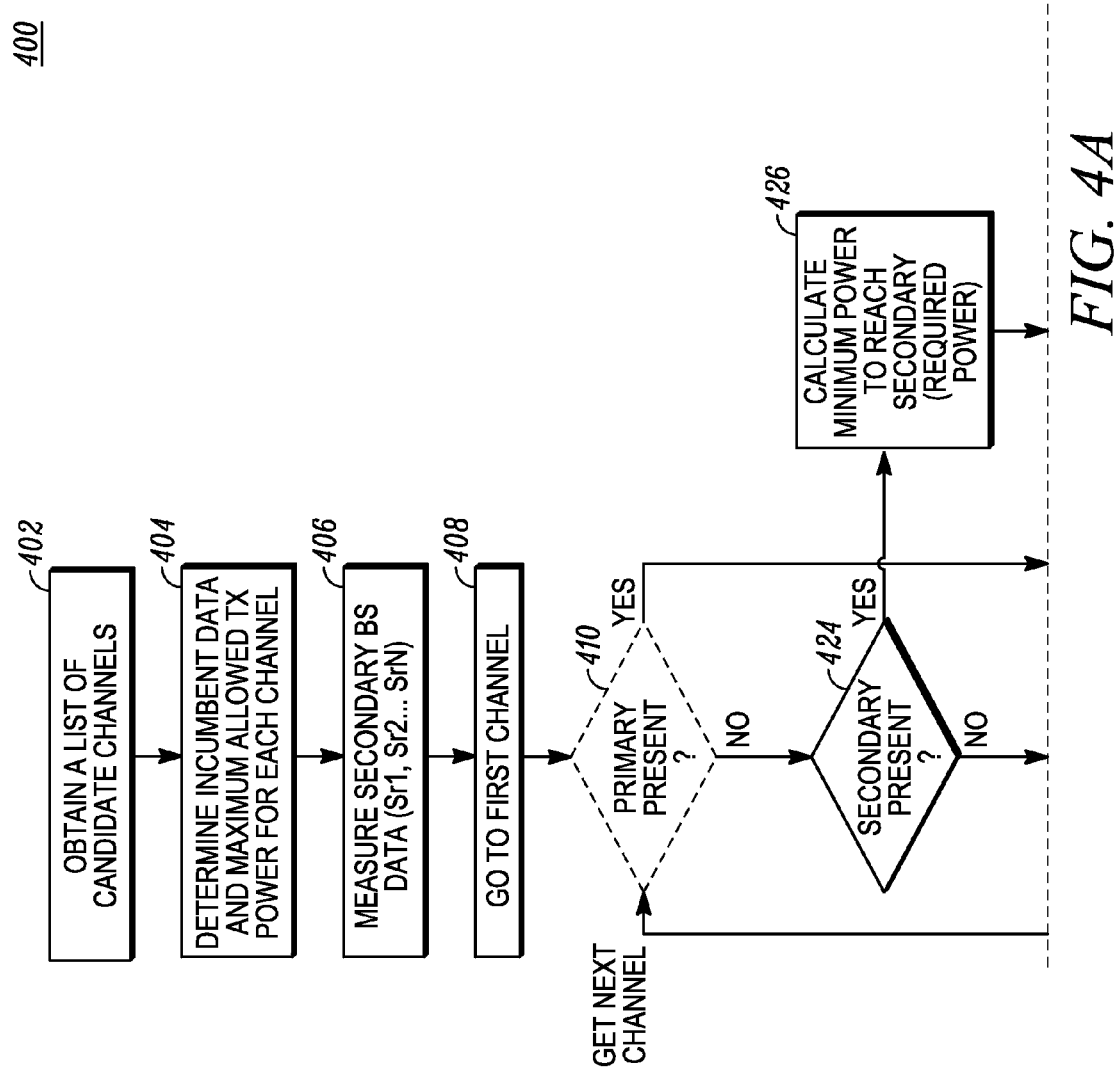

METHOD AND APPARATUS FOR OPTIMIZING SPECTRUM UTILIZATION BY A COGNITIVE RADIO NETWORK

FIELD OF THE INVENTION

The invention generally relates to communication systems and more particularly to cognitive radio networks and the utilization of spectrum.

BACKGROUND OF THE INVENTION

Wireless products and services have continued to expand to the point that finite resources of available communication spectrum are being overwhelmed. Industry has been forced to make dramatic changes, as it must adapt to accommodate the exponential demand on spectrum access, efficiency and reliability.

The Federal Communications Commission (FCC) in the United States, and its counterparts around the world, allocate radio spectrum across frequency channels of varying bandwidth. Various bands may cover, for example, broadcast radio, television, cellular phones, citizen's-band radio, pagers and so on. As more devices go wireless, an increasingly crowded radio spectrum needs to be shared. Although the radio spectrum is almost entirely occupied, based on current methods of fixed spectrum allocation and licensing, not all devices use portions of the licensed radio spectrum at the same time or location. At certain times, a large percentage of the allocated spectrum may be sitting idle, even though it is officially assigned and accounted for.

Cognitive radio is a paradigm for wireless communication in which either a network or wireless device alters its transmission or reception parameters to avoid interference with licensed or unlicensed incumbent users. Cognitive radios must implement methods to avoid selecting an occupied frequency, so as to avoid interference to the incumbent device. Cognitive radio systems utilizing several base stations present additional challenges to spectrum sharing in terms of coordination and management that avoids interference amongst both the cognitive network itself and the incumbent system.

Accordingly, it would be highly desirable to optimize spectrum sharing amongst cognitive radio systems and incumbent systems, particularly in the case of multiple cognitive base stations.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIGS. 4A and 4B illustrate a flowchart of base selection in accordance with an embodiment of the invention.

Figure 1:
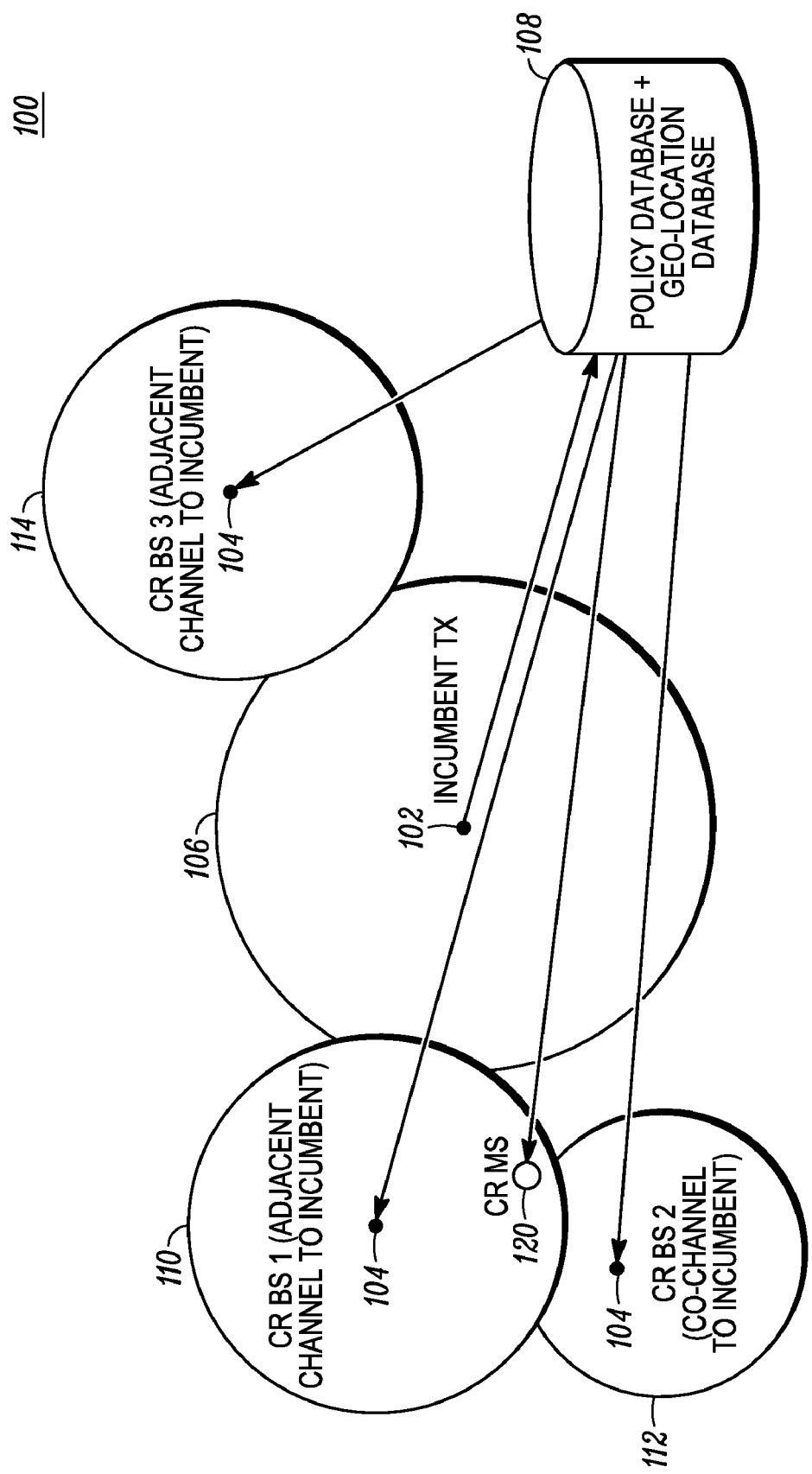
FIG. 1 is a system diagram of a cognitive radio network operating within an incumbent network's spectrum in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to optimum base station or an operational channel selection by a subscriber in a cognitive radio (CR) network, where the cognitive network is seeking to utilize an incumbent network's spectrum. The method may be utilized for optimum operational channel selection in the case of one or more base stations. The cognitive radio system of the present invention may employ one or more CR base stations, each operating over one or more channels in an incumbent network's spectrum. Thus, selection of an optimum base station and/or optimum channel for operation without interfering with incumbent systems is highly beneficial to both systems. The method of selecting the optimum base station and/or optimum channel may further encompasses adapting the selection based on mobility of a CR subscriber. The CR subscriber ranks CR bases stations based on certain parameters, selects an optimum base station for operation, and then continuously re-ranks the base stations based on mobility of the CR subscriber. Reliable communications can thus be maintained by the adaptive ranking and selection of the CR base station.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

For the purposes of this application, a primary system is an incumbent (or pre-existing) user of a frequency spectrum.

Incumbents are often licensed users, such as TV broadcasters in the TV spectrum. The primary system may contain a television receiver that is within a service contour, licensed wireless microphones, or other systems governed by the FCC or other regulatory body. A secondary system may comprise a variety of communication networks, for example a public safety network, cellular network or other system having at least one master node, for example a base station, and slave node, typically in the form of a subscriber unit, such as a portable radio, cell-phone, PDA or the like. Secondary systems may also include ad hoc networks, where multiple units communicate among each other, and may dynamically designate master and slave nodes. There is an increased interest in deploying public safety devices in secondary spectrum to improve interoperability, range and data throughput and maintain mission criticality in case of emergencies and disaster management scenarios.

FIG. 1 shows a system diagram of an incumbent device 102 and a plurality of secondary base stations 104 (labeled CR BS 1, CR BS 2, CR BS 3) seeking to share spectrum within the incumbent's spectrum in the geographic area 106 in accordance with an embodiment of the invention. Each incumbent transmitter 102 typically updates a policy and geo-location database 108 with any changes in its transmission and reception parameters, protected contours etc. Database 108 also incorporates all co-channel and adjacent channel incumbent interference protection requirements. The plurality of secondary base stations 104 operate in accordance with the data provided by database 108. Secondary base stations 104 may periodically sense for the presence of an incumbent and vacate that frequency or spectrum as soon as any incumbent system activity is detected. In this embodiment, relative to the incumbent transmitter 102, CR BS 1 is operating on an adjacent channel, CR BS 2 is operating on a co-channel, and CR BS 3 is operating on another adjacent channel. In accordance this embodiment, a CR mobile subscriber, CR MS 120, selects one of the secondary base stations CR BS 1, CR BS 2, or CR BS 3 based on ranking criteria which is determined as provided herein.

In accordance with this embodiment, ranking criteria for secondary base station selection by the CR mobile subscriber 120 is based on: maximum allowed CR mobile transmit power versus location (as may be computed by the base station from the database 108 and broadcast by the base station on the control channel, or may be computed locally based on sensing/scanning); required CR mobile transmit power estimated from CR base station signal measurements; frequency separation of the CR base and mobile station from active incumbents; and link budget estimated by the CR mobile for prospective CR base stations. Estimated link budget, maximum allowed transmit power levels, and potentially local noise levels per channel are all taken into account to achieve optimum base site or channel selection (also referred to as Quality of Service or QoS) for the CR mobile subscriber 120. The local noise level per channel of both the base station and the CR mobile are taken into account for ranking purposes. The base station can broadcast the local noise level for each channel along with the list of candidate channels. The database 108 may be stored within the CR mobile subscribers for the locations within which it operates. Database 108 is updated with current policy and geo-location information by incumbent 102. Each base station is ranked based on estimated link budgets (which require knowledge of path loss) and channel usability (which is time and location varying). Thus actual link budgets, mobility and transmit power levels are all taken into account to achieve optimum QoS for the CR mobile subscriber 120.

The selection of an optimum communications channel by each base station comprises obtaining a list of candidate channels from a geo-location database based on location of the base station; determining a maximum allowed transmit power level on each of a plurality of candidate channels based on geo-location; measuring a power level and optionally a noise/interference level on each of the plurality of candidate channels; computing an estimated link budget for each candidate channel, wherein the estimated link budget comprises a difference between the maximum allowed transmit power level and the corresponding measured power level for the candidate channel; and selecting the channel that has the highest estimated link budget for communications.

The maximum allowed CR mobile transmit power vs. location parameter is calculated via the geo-location database 108 or through spectral sensing measurements made by the CR mobile subscriber 120, based on all co-channel and adjacent channel transmission requirements associated with the incumbent(s). The method essentially selects a channel that supports the highest usable dynamic range (or signal to noise plus interference ratio) for communications. The maximum allowed transmit power level for each channel may be determined through geo-location means, through sensing means, or a combination of geo-location and sensing means. Geo-location based power determination methods indicate a maximum CR unit power level based on the unit's proximity (in distance and/or operating frequency) to other users (e.g., incumbents) of the spectrum. Spectral sensing based power determination methods indicate a maximum CR unit power level based on sensing measurements of other users (e.g., co- and adjacent channel incumbents) of the spectrum. In both cases, maximum CR unit transmit power levels are limited by proximity to other users and their interference protection requirements.

The maximum allowed CR transmit power vs. location or environment is generally determined to be a safe maximum power level limit for the CR device to utilize, which ensures that harmful interference does not occur to incumbent users. Harmful interference levels are generally determined to be interference or undesired signal levels that exceed prescribed interference protection ratios, such as desired-to-undesired (D/U) ratios. These ratios are often determined based on incumbent type (e.g., DTV service, analog TV service, etc.).

Based on the maximum allowed transmit power level and measured parameters, the CR unit (i.e., CR base station or CR subscriber) may estimate both the downlink and uplink channel, using either active or passive channel measurements. Active channel measurement involves one unit sending out channel sounding bauds or other signals, to allow another unit to measure the received signal to estimate the channel (e.g., to determine path loss, etc.). Passive channel measurements typically involve measuring background noise and interference levels on each channel (see below). Active channel measurements are discussed in conjunction with Table I while passive channel measurements are discussed in conjunction with Table II.

In Time Division Duplex (TDD) communication systems, the downlink channel is often estimated to be the same as the uplink channel (especially over short time frames). Thus, the path loss on the downlink channel can be estimated to be the same as the uplink channel. In Frequency Division Duplex (FDD) systems, the uplink and downlink channels often have to be estimated separately. Typically multiple channels (e.g., channel N−1, N, and N+1) are available for CR use, each with differing maximum allowed transmit power levels. An example of ranking criteria by a CR subscriber for a TDD system is shown in Table I below:

TABLE I

| Ranking Criteria | Secondary BS 1 Channel (N − 1) | Secondary BS 2 Channel (N) | Secondary BS 3 Channel (N + 1) |
|---|---|---|---|
| Maximum allowed TX Power of BS | 30 dBm | 10 dBm | 40 dBm |
| Measured RSSI at MS (from BS) | −70 dBm | −75 dBm | −90 dBm |
| Estimated Path Loss | 100 dB | 85 dB | 130 dB |
| Required TX Power of MS | 20 dBm | 5 dBm | 50 dBm (>max) |
| Rank | 2 | 1 | 3 |

The required transmit power of the CR mobile subscriber from Table I above can be calculated in the manner shown below. This method assumes active sounding of the channel (e.g., the BS sends out a signal on each candidate channel to allow MSs to estimate the path loss). This signal may be sent during normal communications (e.g., preambles, sync bauds, etc.) or it may serve the specific purpose of sounding the channel (e.g., sounding bauds). Typically, existing secondary base stations in a system will already be actively transmitting to other users in a system, so no special additional signaling will be required.

The received RSSI for the CR MS is given by, $$RSSI_{MS} = EIRP_{BS} - PL = P_{TX,BS} + G_{TXA,BS} + G_{RXA,MS} - PL$$

where $P_{TX,BS}$ is the base transmit amplifier power output (TPO) level of the base station, and $G_{TXA,BS}$ is the transmit antenna gain of the base station, $(P_{TX,BS} + G_{TXA,BS})$ is the Effective Isotropic Radiated Power (EIRP) level of the BS signal, PL is downlink path loss and $G_{RXA,MS}$ is receive antenna gain of MS. All components of the equation are typically represented logarithmically (in dB format). Note that the measured received RSSI level may have to be adjusted to remove (i.e., subtract out) the effects of known incumbent transmitters on co- and/or adjacent channels, since these terms represent interference, and not the desired signal.

Thus, the downlink (base to mobile) path loss is $$PL = (P_{TX,BS} + G_{TXA,BS}) + G_{RXA,MS} - RSSI_{MS}$$

The MS can estimate path loss based on the knowledge of BS EIRP level and its own antenna gains. The base would typically broadcast the transmit power levels and antenna gain (or EIRP) that it is utilizing on each channel to allow MSs to readily estimate the path loss (as above) for each channel. Alternatively, the MS could compute the maximum BS EIRP level based on the BS location, which can be broadcast by the BS. Note that filtering may take place on measured RSSI values to reduce the variance of this measure. Each CR BS may also broadcast its local noise-plus-interference floor level for each channel so that the CR MS can make a more informed ranking of the uplink budgets. By knowing its own local noise-plus-interference floor, a MS can make a more informed ranking of the downlink budget for each BS as well.

For Time Division Duplex systems, the path loss (PL) can be assumed to be reciprocal (that is, the path loss in the downlink is equal to the path loss in the uplink, as long as the antenna gains remain constant). If the channel is not reciprocal (as in frequency division duplex systems), the path loss should be estimated on each channel (e.g., uplink and downlink), and the appropriate path loss estimate for the chosen frequency should be utilized.

The maximum RSSI based on allowed MS Tx EIRP and PL is then given by, $$RSSI_{TGT,BS} = P_{TX,MS} + G_{TXA,MS} + G_{RXA,BS} - PL,$$

where $P_{TX,MS}$ is the required transmit power output (TPO) of the MS to achieve the target RSSI level at the BS ($RSSI_{TGT,BS}$). Thus, if all other factors are equal, such as noise levels, the MS would select the channel with the minimum path loss to transmit on, which tends to maximize received signal-to-noise ratio (SNR). In CR systems though, the noise floor and maximum allowed transmit power on each channel typically varies with device environment (e.g., device location or sensed environment), which adds variability into the above equation. The maximum allowed transmit power level cannot be exceeded on any given channel, and may limit the achievable target RSSI level at the base station. (This situation is shown in the last column of Table I.)

Substituting in the estimated downlink path loss (for reciprocal channels, where the uplink path loss equals downlink path loss, as described above):

$$RSSI_{TGT,BS} = P_{TX,MS} + G_{TXA,MS} + G_{RXA,BS} - P_{TX,BS} - G_{TXA,BS} - G_{RXA,MS} + RSSI_{MS}$$

yields:

$$P_{TX,MS} = RSSI_{TGT,BS} - G_{TXA,MS} - G_{RXA,BS} + P_{TX,BS} + G_{TXA,BS} + G_{RXA,MS} - RSSI_{MS}$$

Hence, knowing the target received signal strength ($RSSI_{TGT,BS}$) for the secondary base station (e.g., based on a target bit error rate for the desired modulation), the antenna gains and the transmit power of the secondary base station ($P_{TX,BS}$) allows the required transmit power of the CR mobile subscriber ($P_{TX,MS}$) to be calculated as shown above. Note that the transmit and receive antenna gains may cancel out of the above equation if they are equal, the transmit antenna gain is often equal to the receive antenna gain. The selected channel would then typically be the channel with the minimum path loss, or equivalently, the lowest required MS transmit power level (as long as that power level does not exceed the maximum allowed power level for that particular channel).

Also note that the target RSSI level at the base station may be directly impacted by the local noise (plus interference) level at the base station, as follows:

$$RSSI_{TGT,BS} = C/I_{TGT,BS} + (N+I)_{BS}$$

where $C/I_{TGT,BS}$ is the carrier to interference ratio target at the BS (based on desired bit error or frame error rates). The noise plus interference measure is typically measured by the base station (during quiet periods) for each channel that it is utilizing, and the values may be broadcast over a control channel. The MS units may then take into account local (BS) receiver noise levels in their computations, which will in turn influence the required MS transmit power levels and channel/base site selection.

At the CR MS 120, referring to the Table I above using the described active channel sounding method, even though the signal from CR BS 2 is weaker (by 5 dB) at the CR MS 120 (based on RSSI), the CR MS 120 selects CR BS 2 since the path loss estimate is better for CR BS 2. Note that CR BS 2 is actually transmitting with the least transmit power level though, due to its geo-location (e.g., proximity to a co-channel contour).

Alternatively, in another embodiment of the invention, passive estimation of the channel can be performed. Passive estimation does not require active sounding of the channel as described above. Signal to interference plus noise ratio (SINR) can be blindly estimated on each candidate channel and used for channel selection and ranking purposes. This estimation can be performed independently at the BS or MS, and does not require an active signal to be sent out on the channel (e.g., sounding bauds to estimate path loss). The estimated SINR can be calculated for each channel by dividing the maximum (BS or MS) allowable transmit power level $P_{TX}$ (for a given channel (ch), as determined by the unit or system's environment or location) by the measured noise plus interference level for that channel. Received SINR ratios are the ratio of the transmit power minus the path loss divided by the interference plus (uncorrelated) noise power components observed at the unit for that operating channel:

$$SINR_{ch} = [EIRP_{ch} - PL]/[P_{N+I,ch}]$$

which is in turn representative of the achievable modulation level on each link when communicating in a properly scheduled or loaded network. It is assumed that the Effective Isotropic Radiated Power (EIRP) figure above takes into account transmit antenna gains. The path loss (PL) values can be assumed to be equal in the described blind estimation method (and thus do not affect relative ranking results between channels). As above, the channel with the highest estimated SINR is typically utilized for communication. The noise plus interference levels are typically measured during a quiet period in the system.

Stated another way, the channel (or BS operating frequency) with the highest estimated passive link budget can be chosen for communication. Stated logarithmically in dB (as above), the passive link budget ($LB_{est,ch}$) can be estimated for each channel as:

$$LB_{est,ch} = EIRP_{ch} - P_{N+I,ch}$$

where $P_{N+I,ch}$ is the measured background noise and interference level on the channel (typically averaged at the receiver during a quiet periods on the channel). Typically, $EIRP_{ch}$ is taken to be the maximum allowed EIRP per channel, as determined by a geo-location database or through sensing means. These levels are typically dictated by operating regulations in the band. $EIRP_{ch}$ may alternatively represent the power level that is chosen to be transmitted on each channel, if it is further constrained due to other reasons (e.g., power amplifier limitations).

Table II illustrates the passive channel estimation process described above:

TABLE II

| Ranking Criteria | Secondary BS 1 Channel (N − 1) | Secondary BS 2 Channel (N) | Secondary BS 3 Channel (N + 1) |
|---|---|---|---|
| Maximum allowed TX Power of BS | 25 dBm | 10 dBm | 36 dBm |
| Measured $P_{N+I,ch}$ (typ. at BS) | −70 dBm | −90 dBm | −60 dBm |
| Estimated Link Budget ($LB_{est,ch}$) | 95 dB | 100 dB | 96 dB |
| Rank | 3 | 1 | 2 |

Thus in the case of passive channel estimation, the CR unit (e.g., BS) would choose to transmit on channel N, even though that channel allows the lowest maximum transmit power (or EIRP) level. The estimated link budget on that channel is the best available though, due to the lower noise plus interference levels on that channel. The CR BS may utilize this type of passive channel selection method at power up, before a link with a CR MS is established. Accordingly, examples have been provided of both active (Table I) and passive (Table II) channel measurements.

Figure 2:
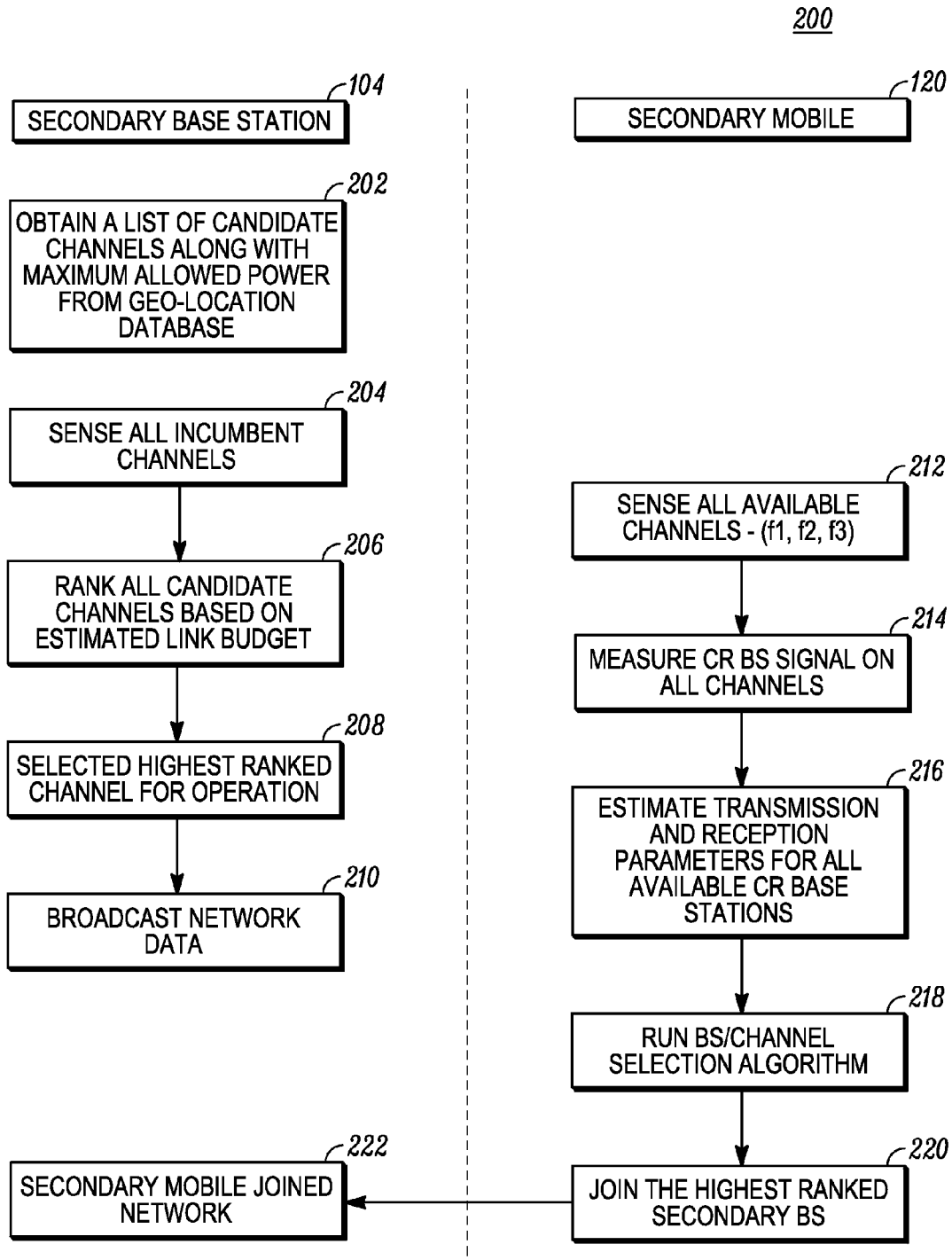
FIG. 2 a flowchart of secondary base station selection in accordance with an embodiment of the invention.

Moving on to FIG. 2, there is shown a flowchart of a method for secondary base station selection and mobility in accordance with an embodiment of the invention. The system illustrated is a TDD communications network.

Beginning at 202, the CR base stations 104 obtain a list of candidate channels along with maximum allowed transmit power (e.g., from geo-location database 108) and then proceed to sense all incumbent channels at 204. At 206, the secondary base stations 104 determine available TV Whitespace frequencies and selects, at 208, the best operating channel for its location (typically through the passive channel estimation methods described above). Each CR base station 104 typically selects the best channel to operate on using a combination of the geo-location information from the database 108 and passive channel estimation results. Each base station starts operating the CR network on the best available TV channel and broadcasting CR network data at 210. In the embodiment of FIG. 1, this would equate to CR BS1 operating and broadcasting on f1 (channel N−1), CR BS2 on f2 (channel N) and CR BS3 on f3 (channel N+1).

The CR MS 120 scans for all available CR channels, generated from the CR stations at 212. In the embodiment of FIG. 1, CR MS 120 is thus scanning the spectrum for a CR channel from each CR base station 104 in order to select one of the CR base stations for operation. The CR MS 120 may scan all frequencies for incumbents, at 212. For active channel estimation, the CR MS 120 measures the CR base station signal strength on all channels at step 214, as described above. For the embodiment of FIG. 1 this would equate to measuring received BS signals strength measurements (RSSI) on each available channel. Transmission and reception parameters are then estimated at step 216 for all available CR base stations based on knowledge of each BS's transmit power level, and possibly its local noise floor level, as described above. Recall that each BS is constrained to transmit with a maximum allowed power level, typically dictated by its operating location (and its proximity to incumbent systems). Determining a MS transmit channel, as discussed above, is based on path loss between each of the CR base station BS1, BS2, BS3 and the CR mobile subscriber, with the path loss being determined by the difference between the transmit power of the CR base station and the received signal strength of the mobile subscriber.

A base station selection and channel selection algorithm is run at 218. Further details pertaining to the base station selection and channel selection algorithm will be described in conjunction with FIG. 4. Briefly the base station selection and channel selection algorithm ranks the base stations based on the estimated path loss values, required transmit power of the mobile subscriber (to reach the base) and transmit power of the base and noise-plus-interference levels at each end of the link. This process may include utilizing the noise plus interference levels at each end of the link, as described above. So, for example, a table such as Table I shown above might be generated for the embodiment of FIG. 1, depending on whether active or passive measurements are taken.

The CR mobile subscriber 120 then joins the highest ranked secondary base station at step 220. In the embodiment of FIG. 1 with the above table this would mean that MS 120 joins CR BS 2. The CR mobile thus joins the network at 222 operating on, but not interfering with, the incumbent's spectrum.

Figure 3:
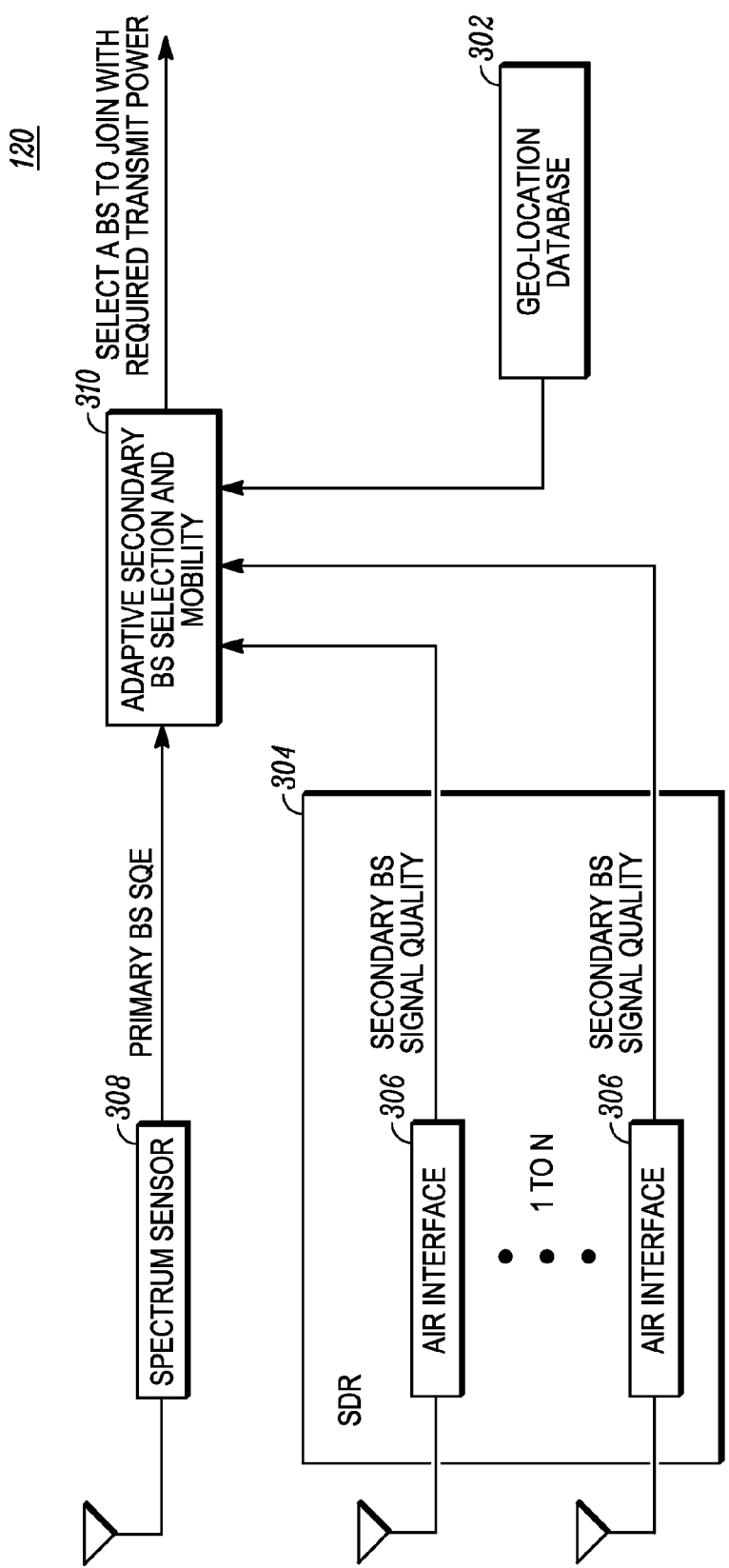
FIG. 3 is a block diagram of a cognitive mobile subscriber in accordance with an embodiment of the invention.

FIG. 3 is a block diagram of a cognitive mobile subscriber (CR MS) 120 in accordance with an embodiment of the invention. In this embodiment a local geo-location database 302 is shown integrated within the CR mobile subscriber 120. The geo-location information provided by the database 302 includes information as to the type of incumbents that the CR subscriber should look for along with contour information for that incumbent and the maximum allowable transmit power for a CR unit at a particular time and location along with other relevant transmission and reception policies and parameters.

The CR mobile subscriber 120 may further include a software defined radio section 304 having a plurality of air interfaces 306 with which to measure signal quality of known secondary base stations. So, for example, CR subscriber 120 would measure the signal quality of CR base stations 104 in FIG. 1. A spectrum sensor 308 may be used to measure the primary systems in the vicinity, either to help validate database 108 information, or to determine maximum transmit power levels based on sensing measurements as described above. The spectrum sensor 308 provides primary base station signal quality (SQ) measurements to cognitive secondary mobile subscriber. The secondary mobile subscriber 120 includes cognitive engine 310 which performs selection of the base station based on the sensed results and then adapts these results in conjunction with mobility of the CR MS 120. Thus the secondary mobile subscriber selects via cognitive engine 310, a base station to join that has sufficient link budget at that particular point in time and at that location.

Figure 4B:
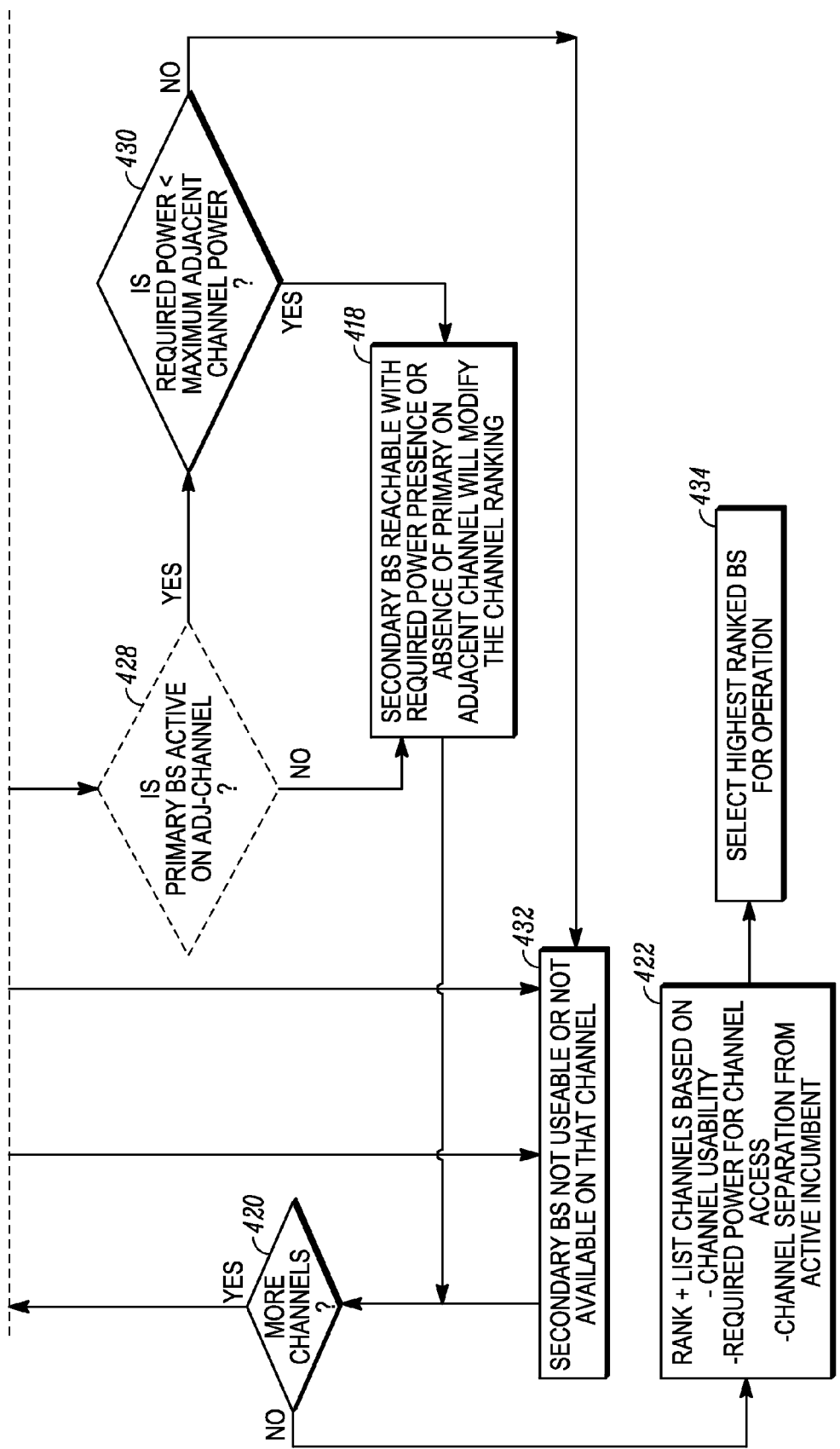

FIGS. 4A/4B illustrate a flowchart of the adaptive CR base station ranking algorithm 400, such as performed by the cognitive engine 310 of FIG. 3, in accordance with an embodiment of the invention. Dashed line steps are optional and may be performed as part of other steps as specified in some cases below. The secondary mobile subscriber starts the routine at step 402 by obtaining a list of candidate channels from local geo-location database or by sensing the entire spectrum of operation if geo-location data is not available locally. The CR mobile determines the incumbent data and maximum allowed transmit power at 404. The incumbent data and maximum allowed transmit power can be determined from the geo-location database, by sensing, or by combination of geo-location database and sensing algorithms at 404. The CR mobile measures secondary base station signal strength for each channel at 406. The secondary subscriber goes to the first channel at 408 and may optionally check to see if a primary (incumbent) device is present on that channel at 410. If a primary is present at 410 then the CR subscriber marks the channel as not available at 432. If more channels are available at 420 the routine returns to step 410. If no more channels are available, then the channels are ranked and listed at 422 based on channel usability (comprising maximum allowed transmit power, link budget), the required power for channel access, and channel separation from active incumbent. The highest ranked BS and its channel are selected by CR mobile for operation at 434.

If no primary was present at 410, the routine checks to see if a secondary system is present at 424. The determination of whether a primary is present or not can be made based on geo-location database or spectrum sensing or based on algorithms utilizing both geo-location database and spectrum sensing. If a secondary is present without a primary 410, 424, then a calculation of minimum power required to reach the secondary base station is taken at 426. An optional check is made at 428 to determine if the primary base station is active on an adjacent channel. Both co-channel and adjacent channel constraints can be taken into account while determining the maximum allowed transmit power level per channel in step 404. The presence of the incumbents on co- or adjacent channels will have the impact of modifying the maximum allowed CR transmit power level, and thus the ranking at 418—which would be reflected in the allowed EIRP level. A check is made at 420 for more channels. If no more channels need to be analyzed then the ranking is completed at 422 and the highest ranked base station is selected at 434. Again, additional channels, if any are analyzed and once completed at 420 the channels are ranked at 422 and a selection is made at 434.

Figure 5:
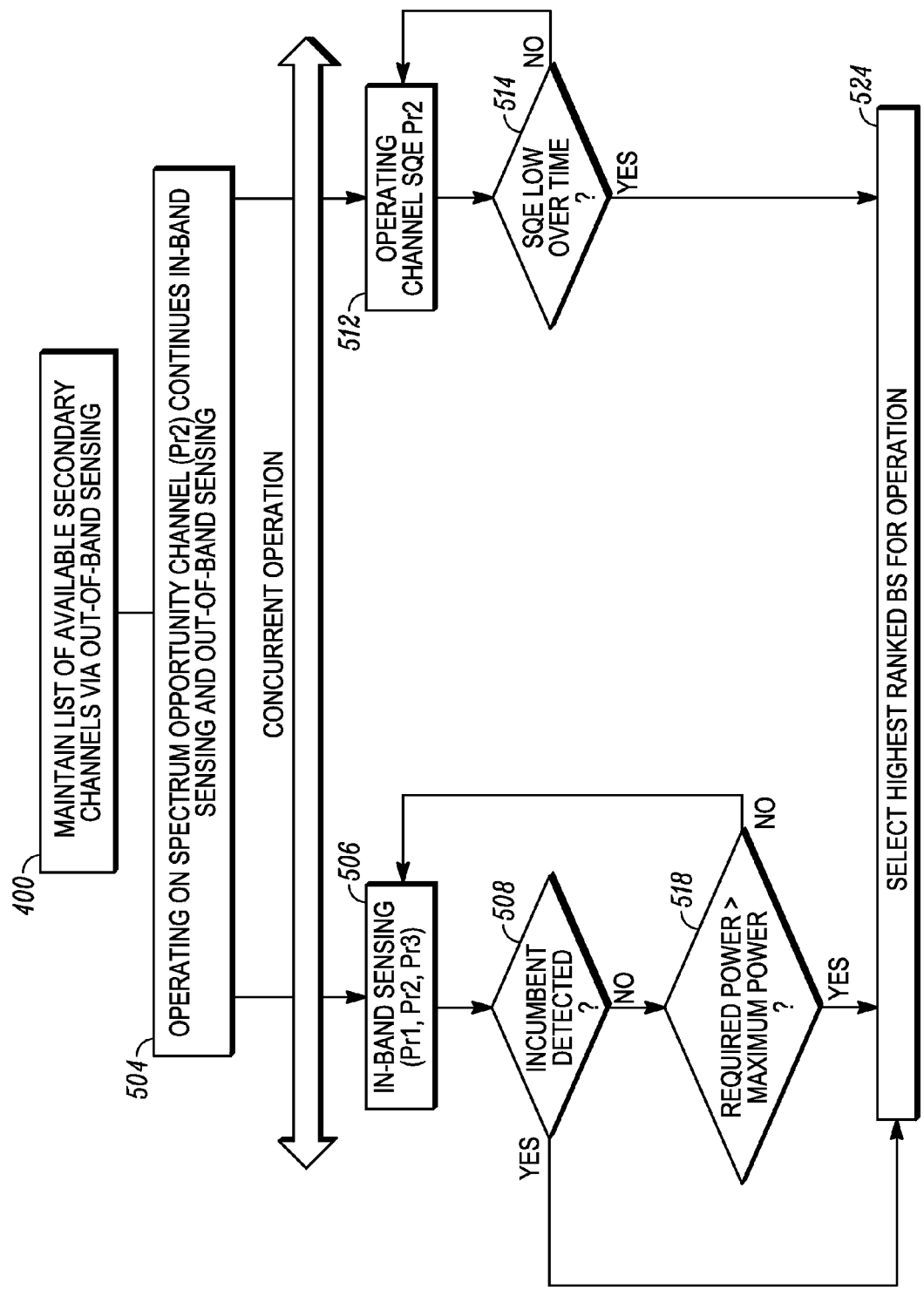
FIG. 5 is a flowchart of adaptive base selection based on mobility in accordance with an embodiment of the invention.

FIG. 5 is a flowchart for maintaining operation in the presence of mobility in accordance with an embodiment of the invention. At this point of operation, the highest ranked base station has been selected with its channel of operation using the technique as provided in the previous embodiment. The mobility of the secondary subscriber however, impacts whether the currently selected base station and channel will continue to be used or whether a switch to another base station and/or channel needs to be made. Algorithm 400 continues to run in order to maintain a list of available secondary channels. At 504, the CR subscriber continuously performs in-band and out-of-band sensing while operating on the channel selected for operation from the algorithm 400. During the in-band sensing, RSSI values (Pr1, Pr2, Pr3) are sensed at 506 where Pr1 and Pr3 are the lower and upper adjacent channel, respectively, where channels Pr1 and Pr3 are affected by CR transmissions on channel Pr2. If an incumbent is detected at 508, then the highest ranked candidate channel is selected for operation at 524. If no incumbent is detected at 508, then the required power of the secondary subscriber to reach the secondary base is compared at 518 to the maximum allowed secondary base power and, if greater, then the highest ranked candidate channel is selected for operation at 524. If the required power to reach the base is less than the secondary base's maximum power (thus still being reachable) then the selected channel remains unchanged and in-band sensing continues at 506.

The operating channel (Pr2) is concurrently sensed at 512 for signal quality (SQ). If the signal quality is determined to be low over time at 514, then the highest ranked candidate channel is selected for operation at 524.

Thus, the mobility is detected based on the presence of an incumbent 508 or the power of the subscriber dropping below that needed to reach the secondary base 518 or a drop in signal quality on the current operating channel 514. The measured incumbent signal level and CR base station signal quality may be integrated over a period of time to take into account short term variations in measurements. If the CR mobile detected the presence of an incumbent or a drop in CR subscriber power or a drop in signal quality then it selects the highest ranked base station for operation at 524 from the list at 502. Hence, the base station selection operating in accordance with the embodiments of the invention is able to remain adaptive within a mobile environment.

Accordingly, there has been provided a means for optimizing spectrum utilization amongst secondary systems (such as cognitive radio systems) and primary systems (such as incumbent systems). Mobile subscribers utilizing a plurality of base stations can now readily rank the base stations and/or operating channel and adapt the system to operating on a different base station and/or channel in response to mobility and other changes in the environment.

While systems exist that detect and mitigate interference using power control and iterative transmit power updates, none of these existing systems have ranked base stations and provided for the selection of an optimum base station based on location and environmental conditions in order to avoid interference to incumbents while operating in their spectrum. Nor have these past systems adapted the rankings based on location and/or sensing while operating in a spectrum on secondary basis where the incumbents limit the maximum allowed transmit power and the operating region of the base stations and the mobiles. While operating in primary's spectrum, the mobile subscriber operating in accordance with the embodiments of the invention adapts operating parameters and selects secondary base stations for operation not only based on the signal quality of the base stations, but also based on the interference generated to the incumbents due to its operation.

Those skilled in the art will appreciate that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for selecting a cognitive radio (CR) channel, comprising the steps at a CR mobile subscriber:

scanning frequency bands to determine the availability of one or more CR base stations at the location of the CR mobile subscriber; determining a transmit power level for each available CR base station; measuring a received power level for each available CR base station; computing an estimated link budget for each candidate channel, wherein the estimated link budget comprises a difference between the transmit power level of the CR base station and the corresponding measured received power level for the CR base station;

calculating required transmit power by the CR mobile subscriber to reach each CR base station and avoid interference to identified incumbents; ranking the CR base stations based on the estimated link budget, required transmit power and maximum allowed transmit power level of the CR mobile subscriber;

selecting and utilizing a highest ranked CR base station and channel for transmission from the CR mobile subscriber; and maintaining CR mobile subscriber communication by switching CR base stations in response to detected mobility of the CR mobile subscriber and further wherein the detected mobility meets a predefined criteria.

2. The method of claim 1, wherein the step of calculating required transmit power by the CR mobile subscriber comprises determining the transmit power level required to achieve a target received signal strength indicator (RSSI) level at the CR base station.

3. The method of claim 1, wherein the step of calculating required transmit power by the CR mobile subscriber further comprises adjusting transmit power levels in proportion to local CR base site noise floor levels per channel.

4. The method of claim 1, wherein the step of determining the CR base stations transmit power level is based on a geo-location of each available base station.

5. The method of claim 1, wherein the maximum allowed CR mobile subscriber transmit power level is determined via geo-location of the CR mobile subscriber.

6. The method of claim 1, wherein the maximum allowed CR mobile subscriber transmit power level is determined via spectral sensing.

7. The method of claim 1, wherein base site noise floor levels are broadcast to the CR mobile subscriber and taken into account during the step of ranking along with the local noise level measured at the mobile.

8. The method of claim 1, wherein the CR base stations rankings are periodically updated in response to mobility of the CR mobile subscriber.

9. The method of claim 1, wherein ranking the base stations is further based on signal to interference plus noise ratios (SINR) and local noise levels at the CR base station and at the CR subscriber.

* * * * *

UNITED STATES PATENT AND TRADEMARK OFFICE
CERTIFICATE OF CORRECTION

PATENT NO. : 8,140,085 B2  Page 1 of 1
APPLICATION NO. : 12/241821
DATED : March 20, 2012
INVENTOR(S) : Chaudhri et al.

It is certified that error appears in the above-identified patent and that said Letters Patent is hereby corrected as shown below:

On the title page, item (56), under "OTHER PUBLICATIONS", in Column 2, Line 1, delete "Writen" and insert -- Written --, therefor.

On the title page, item (56), under "OTHER PUBLICATIONS", in Column 2, Line 3, delete ""mMulti-Bank" and insert -- "Multi-Bank --, therefor.

On the title page, item (56), under "Assistant Examiner", in Column 2, Line 1, delete "Quin Shen" and insert -- Qun Shen --, therefor.

Signed and Sealed this
First Day of January, 2013

David J. Kappos
*Director of the United States Patent and Trademark Office*